(12) United States Patent
Entwistle et al.

(10) Patent No.: US 7,815,162 B2
(45) Date of Patent: Oct. 19, 2010

(54) VALVE ARRANGEMENT

(75) Inventors: Richard Thomas Entwistle, Sydals (DK); Erik Haugaard, Graasten (DK)

(73) Assignee: Danfoss A/S, Nordborg (DK)

( * ) Notice: Subject to any disclaimer, the term of this patent is extended or adjusted under 35 U.S.C. 154(b) by 497 days.

(21) Appl. No.: 10/573,873

(22) PCT Filed: Sep. 28, 2004

(86) PCT No.: PCT/DK2004/000654

§ 371 (c)(1), (2), (4) Date: Mar. 29, 2006

(87) PCT Pub. No.: WO2005/031202

PCT Pub. Date: Apr. 7, 2005

(65) Prior Publication Data

US 2006/0266959 A1    Nov. 30, 2006

(30) Foreign Application Priority Data

Sep. 30, 2003   (DE) ................................. 103 45 856

(51) Int. Cl.
*F16K 31/12* (2006.01)
(52) U.S. Cl. ................................. 251/30.02; 251/30.01
(58) Field of Classification Search ............... 251/26, 251/30.01, 30.02
See application file for complete search history.

(56) References Cited

U.S. PATENT DOCUMENTS

| | | | |
|---|---|---|---|
| 2,925,985 A | 2/1960 | MacDavid | 251/30 |
| 3,506,030 A | 4/1970 | Vesco | 137/595 |
| 4,025,045 A * | 5/1977 | Kubiak | 239/288.5 |
| 4,505,450 A * | 3/1985 | Saarem et al. | 251/24 |
| 4,967,996 A | 11/1990 | Sonoda et al. | 251/30.02 |
| 5,213,303 A * | 5/1993 | Walker | 251/30.02 |
| 5,234,023 A | 8/1993 | Lai | 137/489 |
| 5,687,759 A * | 11/1997 | Tan | 137/486 |

(Continued)

FOREIGN PATENT DOCUMENTS

DE    31 21 619 A1    12/1982

(Continued)

*Primary Examiner*—John K Fristoe, Jr.
(74) *Attorney, Agent, or Firm*—McCormick, Paulding & Huber LLP

(57) ABSTRACT

The invention concerns a valve arrangement (1) with a housing (2), an inlet connection (3) and an outlet connection (4), which are connected with each other via a flow path, in which is located a dosing device (5), which has a valve seat (7) and a valve element (6) interacting with the valve seat (7), the valve element (6) being loaded in the direction of the valve seat (7) by a resetting device (8) and being acted upon on the side facing the valve seat (7) by a pressure in a first pressure chamber (9), said pressure corresponding to the pressure in the inlet connection (3), when the dosing device (5) is dosed, and on the side facing away from the valve seat (7) by the pressure in a second pressure chamber (11), which is connected with the outlet connection (4) via a channel arrangement (14), in which is located at least one auxiliary valve (15), and with the first pressure chamber (9) via a throttle (13). It is endeavoured to reliably ensure that the closing device (5) opens. For this purpose, it is provided that the channel arrangement (14) ends in a suction nozzle arrangement (18), which is located in the flow path.

11 Claims, 1 Drawing Sheet

U.S. PATENT DOCUMENTS

| | | | |
|---|---|---|---|
| 5,884,623 A | 3/1999 | Winter | 128/205.24 |
| 6,135,142 A | 10/2000 | Yokota et al. | 137/486 |

FOREIGN PATENT DOCUMENTS

| | | |
|---|---|---|
| DE | G 85 20 013.1 U | 12/1985 |
| DE | 689 02 788 T2 | 2/1993 |
| DE | 693 03 058 T2 | 11/1996 |
| DE | 693 15 594 T2 | 7/1998 |
| DE | 102 00 273 A1 | 7/2003 |
| WO | WO 94/14501 | 7/1994 |
| WO | WO 99/66270 | 12/1999 |

* cited by examiner

VALVE ARRANGEMENT

CROSS REFERENCE TO RELATED APPLICATIONS

This application is entitled to the benefit of and incorporates by reference essential subject matter disclosed in International Patent Application No. PCT/DK2004/000654 filed on Sep. 28, 2004 and German Patent Application No. 103 45 856.5 filed Sep. 30, 2003.

FIELD OF THE INVENTION

The invention concerns a valve arrangement with a housing, an inlet connection and an outlet connection, which are connected with each other via a flow path, in which is located a closing device, which has a valve seat and a valve element interacting with the valve seat, the valve element being loaded in the direction of the valve seat by a resetting device and being acted upon on the side facing the valve seat by a pressure in a first pressure chamber, said pressure corresponding to the pressure in the inlet connection, when the closing device is closed, and on the side facing away from the valve seat by the pressure in a second pressure chamber, which is connected with the outlet connection via a channel arrangement, in which is located at least one auxiliary valve, and with the first pressure chamber via a throttle.

BACKGROUND OF THE INVENTION

The closing device forms a pilot-controlled valve. Such a valve is particularly used in connection with the control of water, which is exposed to a high pressure. Applications are, for example, car washing plant and fire fighting systems. Also in the field of water hydraulics such a valve can be used.

The mode of operation is relatively simple. Pressure from the inlet connection reaches the second pressure chamber through the throttle and acts upon the valve element with a force, which presses the valve element against the valve seat. Additionally, the force of the resetting device acts upon the valve element in the closing direction, so that the valve element bears on the valve seat. The pressure ruling in the first pressure chamber can exert no force on the valve element, which is sufficient to lift the valve element from the valve seat.

When the auxiliary valve, which acts as a pilot valve, is activated and opens the channel arrangement, the pressure in the second pressure chamber drops to approximately the pressure at the outlet connection. The fluid flows off from the second pressure chamber. Fluid is resupplied to the second pressure chamber through the throttle. Together with the pressure drop at the throttle, the pressure in the first pressure chamber is now sufficient to overcome the force of the resetting device, and the valve element lifts off from the valve seat under the effect of the pressure in the first pressure chamber and the pressure drop at the throttle.

However, with such valves, heavily varying performances have been established during opening. In some cases, the valve element does not lift sufficiently off from the valve seat, so that the desired flow is not released. The valve can then not work with full capacity.

BRIEF SUMMARY OF THE INVENTION

The invention is based on the task of reliably ensuring that the closing device opens.

With a valve arrangement as mentioned in the introduction, this task is solved in that the channel arrangement ends in a suction nozzle arrangement, which is located in the flow path.

Thus, the channel arrangement no longer merely ends in the wall of the flow path. On the contrary, the opening is moved into the flow path, so that the fluid flowing in the flow path can practically suck off the fluid located in the channel arrangement, when the pilot valve is open. It is assumed that the insufficient opening of the closing device, that is, the limited movement of the valve element, has until now been caused by the fact that after the opening of the closing device, that is, shortly after the lifting off of the valve element from the valve seat, a pressure occurs in the outlet connection, which is practically equal to the pressure at the inlet connection. This pressure then propagates through an open channel in the channel arrangement into the second pressure chamber, so that again the valve element is acted upon in the direction of the valve seat by a corresponding force. This force prevents the valve element from moving to a position, in which the closing device is completely open. When, now, the channel ends in a suction nozzle arrangement, which is located in and ends in the flow path, it is consciously ensured that the pressure in the second pressure chamber is reduced to a relatively low value. The fluid flowing off through the outlet connection practically sucks off the fluid available in the second pressure chamber. This has two effects. Firstly, it is avoided that an increased pressure propagates to the second pressure chamber through the channel. Secondly, under certain circumstances, the pressure in the second pressure chamber is even reduced to a value, which is below the pressure level in the outlet connection in the closed state of the closing device. It can now be seen that the valve element lifts off from the valve seat with its whole lift, so that the closing device is completely opened.

Preferably, the suction nozzle arrangement has at least one suction nozzle, which is directed towards the outlet connection and has a bordering wall, whose outside is exposed to the fluid flowing in the flow path. Thus, some kind of water jet pump is realised. The fluid flowing along on the outside of the suction nozzles creates an underpressure in the suction nozzle, which again entrains fluid located in the second pressure chamber. In this manner, the pressure in the second pressure chamber can be reduced with relatively simple means. The direction of the suction nozzle does not have to correspond exactly to the flow direction. Simple tests can be made to determine the angle positions, in which the desired suction effect occurs.

It is also advantageous that the suction nozzle arrangement blocks a fluid entry into the channel. Thus, with the suction nozzle arrangement only openings are available, which are directed towards the outlet connection. Fluid, which is exposed to pressure, can thus not enter into the suction nozzle arrangement and from there reach the second pressure chamber via the channel. On the contrary, all openings in the suction nozzle arrangement are directed completely in the flow direction.

Preferably, the suction nozzle arrangement is connected with the housing in at least two positions. As the suction nozzle arrangement is located in the flow path, it must be assumed, depending on the intended use, that substantial forces act upon the suction nozzle arrangement. The fixing of the suction nozzle arrangement in at least two positions in the housing permits a reliable prevention of a displacement of the suction nozzle arrangement. When the channel arrangement has more than one channel, for example one channel with a pilot valve and one channel with a manually controlled safety valve, it is possible to let the second channel end in the suction nozzle arrangement at the second fixing position.

Preferably, the suction nozzle arrangement has a body, which is located in extension of a pilot valve seat of the auxiliary valve. This keeps the flow losses in the channel, and particularly flow losses in the area of the auxiliary valve, small. To put it simply, merely a deflection is required for the flow, which is sucked from the second pressure chamber. Then, this fluid can flow on straight forward to the suction nozzle arrangement. When the flow resistances are kept small, the second pressure chamber is sucked empty relatively fast.

In a first embodiment, it is ensured that the suction nozzle arrangement has a pipe, which has a slot in the direction of the outlet connection. Such a pipe gives a relatively large outlet nozzle. The pipe is simple in manufacturing. Complicated nozzle shapes are not required. The slot ensures in a simple manner that the lowest pressure ruling in the area of the suction nozzle arrangement will be effective.

Preferably, the pipe is connected with the channel on a frontside. The housing may finish the other frontside. This simplifies the guiding of the fluid leaving the second pressure chamber.

Preferably, the pipe is located in the area of a diameter of the outlet connection. This gives two advantages. Firstly, the suction nozzle can be made relatively large, as also a corresponding housing surface is available, over which the fluid flowing through the flow path can flow. Secondly, the suction nozzle is located in the middle of the flow, that is, in a position, where the flow speed is highest. The higher the flow speed is, the better is the suction effect. Of course, this will not apply for the whole length of the pipe. However, it is sufficient, when a sufficient underpressure is generated at an area of the suction nozzle.

In an alternative embodiment, the suction nozzle arrangement can have an annular nozzle, whose opening is directed towards the outlet connection. A water jet pump effect can also be realised with an annular nozzle.

In a preferred embodiment, it is provided that the suction nozzle arrangement is located in a section of the flow path with reduced cross-section. Preferably, this section is adjacent to the outlet connection. When the cross-section is reduced, the flow speed of the outflowing fluid is increased. In certain limits an increase of the flow speed causes a reduction of the pressure. The reduction of the cross-section thus permits a reduced pressure in the second pressure chamber.

BRIEF DESCRIPTION OF THE DRAWINGS

In the following, the invention is explained in detail on the basis of preferred embodiments in connection with the drawings, showing.

DETAILED DESCRIPTION OF THE INVENTION

Figure 1:
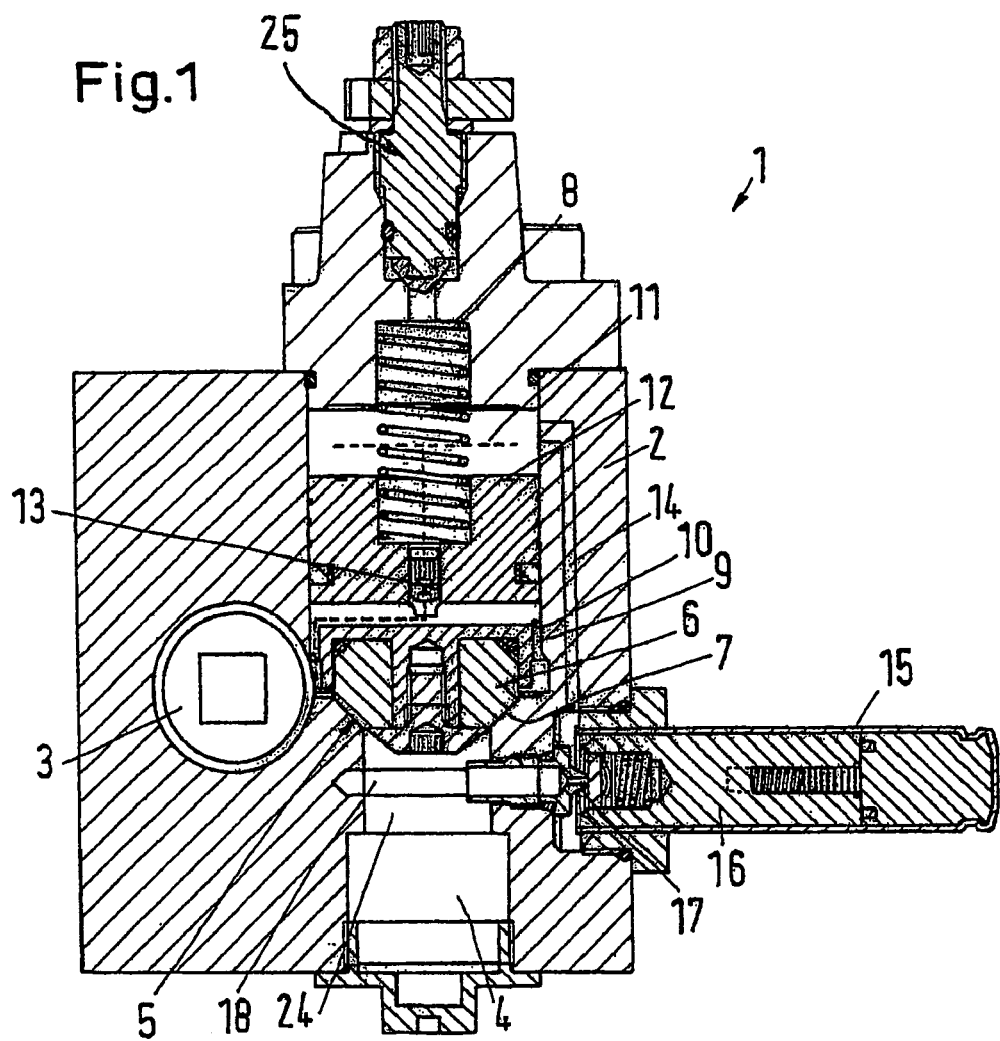
FIG. 1 is a schematic sectional view through a valve arrangement.

A valve arrangement 1 has a housing 2, in which an inlet 3 and an outlet 4 are located. The inlet 3 and the outlet 4 are connected with an inlet connection and an outlet connection, respectively, not shown in detail.

A closing device 5 interrupts a flow path from inlet to outlet, when a valve element 6 bears on a valve seat 7, as shown, or releases this flow path, when the valve element 6 has lifted off from the valve seat 7.

A spring 8, which is supported on the housing 2, loads the valve element in the direction of the valve seat 7, that is, the valve element 6 bears on the valve seat 7 without the assistance of further forces. Thus, a normally closed valve is concerned. The spring 8 forms a resetting device for the valve element 6. A hydraulic resetting device can also replace it.

The inlet 3 is connected with a first pressure chamber 9. In the closed state of the closing device 5, the housing and the valve element 6 border the first pressure chamber 9. The valve element 6 has a first pressure contact face 10, on which the pressure in the first pressure chamber 9 acts.

On the side of the valve element 6 facing the valve seat 7 is located a second pressure chamber 11, which acts upon a second pressure contact face 12 of the valve element 6, the second pressure contact face 12 being substantially larger than the first pressure contact face 10.

Via throttle 13 formed in the valve element 6, the second pressure chamber 11 is connected with the first pressure chamber 9 and thus with the inlet 3, so that after a certain period the pressure in the second pressure chamber 11 will be equal to the pressure in the first pressure chamber 9. Together with the spring 8, the pressure in the second pressure chamber 11 ensures that the valve element 6 bears on the valve seat 7.

Via a channel 14, the second pressure chamber 11 is connected with the outlet 4. In the channel 14 is located an auxiliary valve working as a pilot valve 15, which has a pilot valve element 16 and a pilot valve seat 17. The pilot valve 15 is a solenoid valve, so that the application of a corresponding control signal will cause the pilot valve element 16 to lift off from the pilot valve seat 17 and release the connection from the second pressure chamber 11 to the outlet 4. The pilot valve 15 is also a normally closed valve, which will remain closed when not acted upon by outer energies.

The valve arrangement 1 now works as follows:

When the pilot valve 15 is closed, no fluid (this also applies for a gaseous fluid) can flow off from the second pressure chamber 11 to the outlet. Together with the force of the spring 8, the pressure in the second pressure chamber 11 acting upon the second pressure contact face 12 ensures that the valve element 6 bears on the valve seat 7.

When the pilot valve 15 is opened, the fluid from the second pressure chamber 11 flows off relatively fast to the outlet 4 via the channel 14. This reduces the pressure in the second pressure chamber 11. The fluid supplied through the throttle 13 creates a pressure drop. The hydraulic forces acting upon the pilot valve element 16 are now sufficient to overcome the force of the spring 8. The valve element 6 is lifted from the valve seat 7 and a flow path from the inlet 3 to the outlet 4 is released.

It could be observed that with such a valve arrangement 1, the closing device 5 were not always completely opened, that is, in some cases the valve element 6 would stop after a short while, that is, did not perform the complete opening lift.

In order to avoid this phenomenon, a suction nozzle arrangement 18 is provided, via which the channel 14 ends in the outlet 4.

Figure 2A:
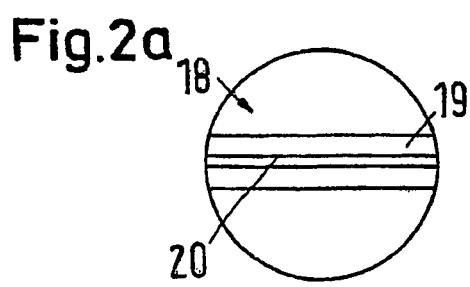
FIG. 2 is a bottom view of a first embodiment of a suction nozzle arrangement in section.
Figure 2B:
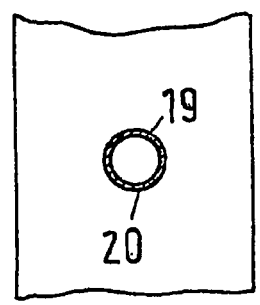

In an embodiment as shown in FIG. 2, the suction nozzle arrangement has a pipe 19, which is provided with a slot 20 directed towards the outlet 4. The pipe 19 thus merely has one opening, which is directed in the flow direction of a fluid flow, which flows from the inlet 3 to the outlet 4. The fluid flowing around the pipe 19 creates the effect of a water jet pump, that is, at the slot 20, which forms a suction nozzle, it creates an underpressure, which propagates into the second pressure chamber 11. Further, the slot 20 prevents fluid from the flow from penetrating into the second pressure chamber. Thus, as long as fluid is flowing from the inlet 3 to the outlet 4, an outer pressure cannot build up in the second pressure chamber 11, which would counteract a movement of the valve element 6 into its opened position. On the contrary, under certain circumstances an even lower pressure will be created in the second pressure chamber 11 than in the outlet 4 with closed closing device 5. Thus, the valve element 6 will assume its largest possible distance from the valve seat 7, so that the use of the suction nozzle arrangement 18 will cause a complete opening of the closing device 5. The slot 20 is located in the area of the largest diameter of the outlet 4. Here, usually the highest flow speed and thus the largest "suction" occur. In principle, however, it is sufficient to locate the slot 20 (or another suction nozzle) in a position, in which a sufficiently low pressure occurs.

Figure 3A:
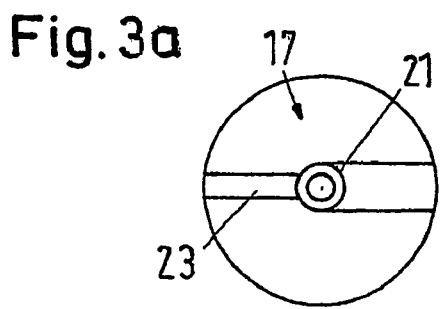
FIG. 3 is a bottom view of a second embodiment of a suction nozzle arrangement in section.
Figure 3B:
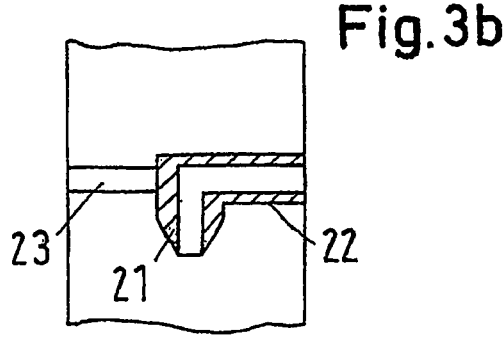

FIG. 3 shows a modified embodiment. Here, the suction nozzle arrangement 18 is formed by an annular nozzle 21, which is connected with the valve seat 17 of the pilot valve via a pipe stub 22. Via an additional bracket 23, the annular nozzle 21 is fixed on the inner wall of the housing 2 facing the pilot valve 15.

The slot 20 or the annular nozzle 21, respectively, which can also simply be an orifice nozzle, does not have to be directed exactly in the flow direction. However, they are not supposed to be directed against the flow direction. Relatively simple tests will show the permissible deviations from the flow direction, which will still provide a satisfactory suction effect.

As is particularly obvious from FIG. 1, the suction nozzle arrangement 18 is located in a section 24 of the flow path, which is adjacent to the outlet 4, and which has a reduced cross-section. The reduced cross-section ensures an increased flow speed of the fluid flowing from the inlet 3 to the outlet 4. A higher flow speed is, however, corresponds to a reduced pressure in the suction nozzle, that is, the slot 20 or the annular nozzle 21.

Merely schematically shown is a safety valve 25, with which, if required, the valve 1 can be opened. When the safety valve 25 is opened, fluid flows from the second pressure chamber 11 via a channel, not shown in detail, to the outlet 4. This channel, not shown in detail, can now be made to end in the end of the suction nozzle arrangement 18 facing the pilot valve 15, so that also for this safety function the corresponding reduction of the pressure in the second pressure chamber 11 is achieved.

With such a pilot-controlled valve, it is not necessary to make the inlet laterally next to the valve element 6 and the outlet through the valve seat 7. Of course, it is also possible to let the fluid flow through the valve seat 7 to the valve element 6. In this case, the inlet 3 and the outlet 4 are interchanged. Of course, the channel 14 and the pilot valve 15 will have to be moved.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A valve arrangement with a housing, an inlet connection and an outlet connection, which are connected with each other via a flow path, in which is located a closing device, which has a valve seat and a valve element interacting with the valve seat, the valve element being loaded in the direction of the valve seat by a resetting device and being acted upon on the side facing the valve seat by a pressure in a first pressure chamber, said pressure corresponding to the pressure in the inlet connection, when the closing device is closed, and on the side facing away from the valve seat by the pressure in a second pressure chamber, which is connected with the outlet connection via a channel arrangement, in which is located at least one auxiliary valve, and with the first pressure chamber via a throttle, wherein the channel arrangement ends in a suction nozzle arrangement, which extends into the flow path.

2. The valve arrangement according to claim 1, wherein the suction nozzle arrangement has at least one suction nozzle, which is directed towards the outlet connection and has a bordering wall, whose outside is exposed to the fluid flowing in the flow path.

3. The valve arrangement according to claim 2, wherein the suction nozzle arrangement blocks a fluid entry into the channel.

4. The valve arrangement according to claim 1, wherein the suction nozzle arrangement is connected with the housing in at least two positions.

5. The valve arrangement according to claim 1, wherein the suction nozzle arrangement has a body, which is located in extension of a pilot valve seat of the auxiliary valve.

6. The valve arrangement according to claim 1, wherein the suction nozzle arrangement has a pipe, which has a slot in the direction of the outlet connection.

7. The valve arrangement according to claim 6, wherein the pipe is connected with the channel on a frontside.

8. The valve arrangement according to claim 6, wherein the pipe is located in the area of a diameter of the outlet connection.

9. The valve arrangement according to claim 1, wherein the suction nozzle arrangement has an annular nozzle, whose opening is directed towards the outlet connection.

10. The valve arrangement according to claim 1, wherein the suction nozzle arrangement is located in a section of the flow path with reduced cross-section.

11. The valve arrangement according to claim 1, wherein the suction nozzle arrangement is for reducing flow chatter of the valve element when the valve element is away from the valve seat.

\* \* \* \* \*

UNITED STATES PATENT AND TRADEMARK OFFICE
CERTIFICATE OF CORRECTION

PATENT NO. : 7,815,162 B2  
APPLICATION NO. : 10/573873  
DATED : October 19, 2010  
INVENTOR(S) : Richard Thomas Entwistle and Erik Haugaard Page 1 of 1

It is certified that error appears in the above-identified patent and that said Letters Patent is hereby corrected as shown below:

Title Page Item [57]

In the Abstract line 4 and line 10 "dosing" should be replaced with --closing--.

Line 10 "dosed" should be replaced with --closed--.

Signed and Sealed this

Thirty-first Day of May, 2011

David J. Kappos  
*Director of the United States Patent and Trademark Office*